United States Patent [19] [11] 4,423,141
Abel [45] Dec. 27, 1983

[54] CARBOXY-ESTER LACTONE POLYMER NEUTRALIZING-TIMING LAYER FOR COLOR TRANSFER ASSEMBLAGES

[75] Inventor: Edward P. Abel, Webster, N.Y.

[73] Assignee: Eastman Kodak Company, Rochester, N.Y.

[21] Appl. No.: 448,572

[22] Filed: Dec. 10, 1982

Related U.S. Application Data

[62] Division of Ser. No. 341,412, Jan. 21, 1982, Pat. No. 4,395,477.

[51] Int. Cl.$^3$ ........................ G03C 1/40; G03C 5/54; B32B 27/06; C08F 34/02

[52] U.S. Cl. .................................... 430/454; 430/216; 428/480; 428/522; 526/271; 526/272; 526/318

[58] Field of Search ............... 430/216, 215, 533, 536, 430/454; 428/480, 522; 526/318, 270, 271

[56] References Cited

U.S. PATENT DOCUMENTS

| | | | |
|---|---|---|---|
| 2,306,071 | 12/1942 | McNally et al. | 430/536 |
| 3,007,901 | 11/1961 | Minsk | 526/271 |
| 3,362,819 | 1/1968 | Land | 430/216 |
| 3,362,821 | 1/1968 | Land | 430/216 |
| 4,029,849 | 5/1977 | Abel | 428/500 |
| 4,229,516 | 10/1980 | Abel | 430/216 |

FOREIGN PATENT DOCUMENTS 1321672 6/1973 United Kingdom .

OTHER PUBLICATIONS

Research Disclosure, Item 12331, vol. 123, Jul. 1974.

*Primary Examiner*—Richard L. Schilling
*Attorney, Agent, or Firm*—Harold E. Cole

[57] ABSTRACT

Photographic assemblages, elements, receiving elements and cover sheets are described employing a single neutralizing-timing layer consisting essentially of a carboxy-ester-lactone polymer having the following recurring units:

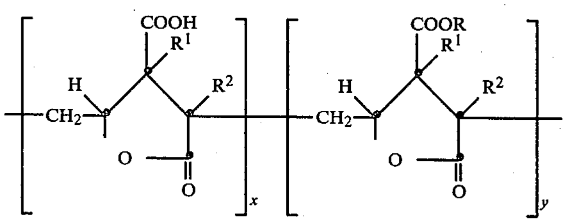

wherein

R is alkyl having from 1 to about 12 carbon atoms or aralkyl having from 7 to about 12 carbon atoms;

$R^1$ and $R^2$ are each independently hydrogen or methyl;

x is about 1 to about 15 mole %; and y is about 85 to about 99 mole %.

3 Claims, No Drawings

CARBOXY-ESTER LACTONE POLYMER NEUTRALIZING-TIMING LAYER FOR COLOR TRANSFER ASSEMBLAGES

This is a division of application Ser. No. 341,412, filed Jan. 21, 1982, now U.S. Pat. No. 4,395,477.

This invention relates to photography, and more particularly to photographic assemblages, elements, receiving elements and cover sheets for color diffusion transfer photography wherein a single neutralizing-timing layer is employed. This neutralizing-timing layer consists essentially of a certain carboxy-ester-lactone.

Various formats for color, integral transfer elements are described in the prior art, such as U.S. Pat. Nos. 3,415,644; 3,415,645; 3,415,646; 3,647,437; 3,635,707; 3,756,815, and Canadian Pat. Nos. 928,559 and 674,082. In these formats, the image-receiving layer containing the photographic image for viewing remains permanently attached and integral with the image generating and ancillary layers present in the structure when a transparent support is employed on the viewing side of the assemblage. The image is formed by dyes, produced in the image generating units, diffusing through the layers of the structure to the dye image-receiving layer. After exposure of the assemblage, an alkaline processing composition permeates the various layers to initiate development of the exposed photosensitive silver halide emulsion layers. The emulsion layers are developed in proportion to the extent of the respective exposures, and the image dyes which are formed or released in the respective image generating layers begin to diffuse throughout the structure. At least a portion of the imagewise distribution of diffusible dyes diffuse to the dye image-receiving layer to form an image of the original subject.

Other so-called "peel apart" formats for color diffusion transfer assemblages are described, for example, in U.S. Pat. Nos. 2,983,606; 3,362,819 and 3,362,821. In these formats, the image-receiving element is separated from the photosensitive element after development and transfer of the dyes to the image-receiving layer.

In color transfer assemblages such as those described above, a "shut-down" mechanism is needed to stop development after a predetermined time, such as 20 to 60 seconds in some formats, or up to 3 minutes or more in other formats. Since development occurs at a high pH, it is rapidly slowed by merely lowering the pH. The use of a neutralizing layer, such as a polymeric acid, can be employed for this purpose, which will stabilize the element after the required diffusion of dyes has taken place. A timing layer is usually employed in conjunction with the neutralizing layer, so that the pH is not prematurely lowered, which would stop or restrict development. The development time is thus established by the time it takes the alkaline composition to penetrate through the timing layer. As the system starts to become stabilized, alkali is depleted throughout the structure, causing silver halide development to substantially cease in response to this drop in pH. For each image generating unit, this shutoff mechanism establishes the amount of silver halide development and the related amount of dye formed according to the respective exposure values.

In U.S. Pat. Nos. 3,362,819, 3,362,821, 4,029,849 and U.K. Pat. No. 1,321,672, the use of polymeric acid layers in diffusion transfer materials are described. Inert polymeric spacer layers or timing layers to be used with these polymeric acid layers are also described in these patents. There is no indication in these patents, however, that the functions of a polymeric acid layer and a timing layer can be combined into a single layer.

In my U.S. Pat. No. 4,229,516, issued Oct. 21, 1980, temporary barrier layers are described comprising a mixture of a vinylidene chloride terpolymer and certain polymeric carboxyester-lactones. This barrier layer is also to be used in conjunction with a neutralizing layer. There is no indication in that patent, however, that the functions of the neutralizing layer and the barrier layer can be combined into a single layer.

In *Research Disclosure* Article 12331 of July, 1974, various neutralizing layer and timing layer materials are described. In the list of timing layer materials, there is described poly(vinyl acetate-co-maleic anhydride) treated to form an intramolecular ester-lactone. There is no disclosure in this article, however, that this particular material can be employed without a neutralizing layer. There is also no disclosure of the particular mole ratios of the two components of the lactone necessary to enable this material to function as a combined neutralizing-timing layer, as described herein.

Problems such as adhesive failure at the interface between the neutralizing layer and timing layer are sometimes encountered. The physical properties of both layers must be carefully balanced to prevent such problems. If the functions of a neutralizing layer and a timing layer could be combined together in a single layer, then such problems would be eliminated. There would also be significant economies involved in coating one layer instead of two, and employing one material to accomplish the functions of two. These advantages are achieved by this invention.

In accordance with my invention, there is provided a photographic assemblage which comprises:

(a) a photographic element comprising a support having thereon at least one photosensitive silver halide emulsion layer having associated therewith a dye image-providing material;

(b) a dye image-receiving layer;

(c) neutralizing means for neutralizing an alkaline processing composition; and (d) timing means located between the neutralizing means and the dye image-receiving layer;

the improvement wherein the neutralizing means and the timing means are provided by a single layer which functions as a combined neutralizing-timing layer and consists essentially of a carboxy-esterlactone polymer having recurring units of the formula:

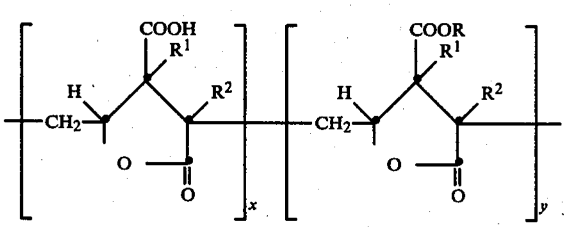

wherein

R is alkyl having from 1 to about 12 carbon atoms or aralkyl having from 7 to about 12 carbon atoms;

$R^1$ and $R^2$ are each independently hydrogen or methyl;

x is about 1 to about 15 mole %; and y is about 85 to about 99 mole %.

In the above formula, R represents an alkyl group having from 1 to about 12 carbon atoms, such as methyl, ethyl, propyl, isopropyl, butyl, hexyl, decyl, or dodecyl; or an aralkyl group having from 7 to about 12 carbon atoms, such as benzyl, phenylethyl, phenylpropyl, phenylbutyl, or tolylbutyl. These alkyl or aralkyl groups can also be substituted with substituents as long as they do not interfere with the esterification-lactonization reaction described below or the desired properties of the resulting polymeric carboxy-ester-lactone. Examples of such substituents include halogen substituents such as chloro, amino substituents such as dimethylamino, or alkoxymethyl substituents such as methoxymethyl. In a preferred embodiment of the invention, R is n-butyl and each $R^1$ and each $R^2$ is hydrogen.

As noted above in the formula, x is about 1 to about 15 mole percent. This provides an acid content of the polymer of up to about 1 meq. acid per gram of polymer. In a preferred embodiment of my invention, the polymer comprises from about 0.5 to about 1.0 meq. acid per gram of polymer. This provides an optimum balance of the hydrophilic/hydrophobic properties of the lactone polymer. The penetration time by alkali of this polymer can be modified by changing its carboxyl content. Increased acid content decreases the penetration time since the layer becomes more hydrophilic and more permeable to alkali.

In the above formula, x and y will usually add up to 100. When they total less than 100, minor amounts of one or more inert comonomers can be employed.

This single coated layer thus serves the dual functions of both a neutralizing layer and a timing layer. In a preferred embodiment, the final pH of a film unit employing this dual neutralizing-timing layer is about 8.5. The pH is lowered (alkali consumed) by neutralization of the free carboxyl groups, by opening of the lactone ring and by hydrolysis of the ester groups.

The final equilibrium pH of about 8.5 of a film unit employing this dual neutralizing-timing layer also provides an improvement in stability to light exposure with certain metallized azo dyes. Dmin values are also more stable over a long period of time. These features will be illustrated by the examples hereinafter.

The carboxy-ester-lactones described above can be prepared by lactonization and esterification of poly(vinyl acetate-co-maleic anhydride) (1:1) with a monohydric alcohol, such as n-butanol. During the reaction, the copolymer is deacetylated, the anhydride is opened, the lactone ring is then formed, and then esterified with the alcohol to form the mixed alkyl ester and carboxy ester.

A copolymer of maleic anhydride and vinyl acetate having the repeating units:

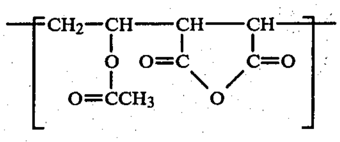

can be prepared by copolymerizing a mixture of maleic anhydride and vinyl acetate in an organic solvent, such as dichloroethane, in a tank attached to a reactor. The reactor is charged with solvent, and both the tank and the reactor are degassed with nitrogen. The reactor is heated and a small amount of initiator such as 2,2'-azobis(2-methylpropionitrile) is added. The contents of the tank is pumped slowly into the reactor with stirring. After the addition is complete, the mixture is stirred and heated under nitrogen. The reactor is then cooled and the precipitate is filtered off, washed with solvent and air dried.

Lactonization and esterification of the above copolymer to produce the polymeric carboxyester-lactone used in the invention can be accomplished by heating the poly(vinyl acetate-co-maleic anhydride) to reaction temperature, typically 60° to 100° C., and stirring with a monohydric alcohol, such as n-butanol, in an organic solvent such as dioxane. (Alternatively, the reaction may be carried out in a partially aqueous medium. This is particularly desirable, though not necessary, when treating an anhydride copolymer.) The suspension is stirred until a smooth dope is obtained. To this is added a lesser amount of mineral acid catalyst, such as sulfuric acid or hydrochloric acid. The mixture is stirred and heated for 2 to 24 hours and then cooled. The dope is diluted with an organic solvent, such as acetone, to precipitation viscosity. The dope is poured into distilled water to obtain a soft and partially fibrous product. The polymer is stirred with repeated changes of distilled water, until free from mineral acid. The hardened polymer is filtered off and vacuum or air dried.

The carboxyl content, which is a measure of the relative acid versus ester composition of the final polymer, can be modified by adjusting the relative amounts of alcohol and water used in the lactonization and esterification procedure. The carboxyester-lactone preferably has from about 0.5 to about 1.0 millequivalents of acid per gram of polymer as described above.

The polymeric neutralizing-timing layer can be coated at any amount which is effective for the intended purpose. Preferably, it is coated at a coverage in the range of about 5 to about 25 g/m$^2$ of element, preferably about 10 to about 16 g/m$^2$.

The polymer is conveniently dissolved as a 20-30% solution in a solvent such as 2-butanone and coated by conventional solvent coating procedures.

For further description of the carboxyester-lactones useful in this invention, reference is made to my U.S. Pat. No. 4,229,516, referred to above, the disclosure of which is hereby incorporated by reference.

Examples of carboxy-ester-lactones useful in my invention include the following:

Compound 1

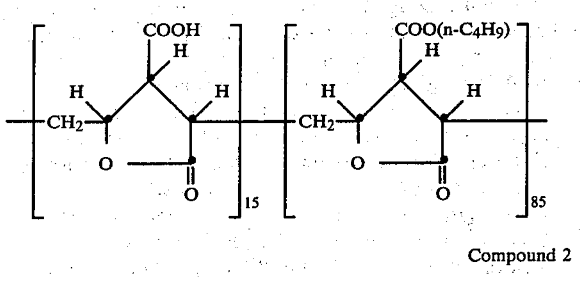

Compound 2

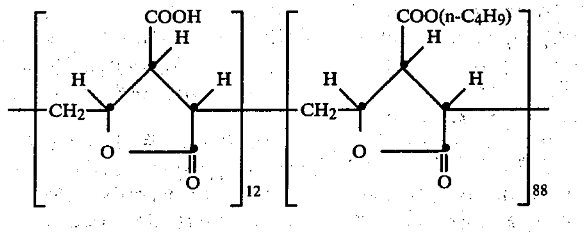

-continued

Compound 3

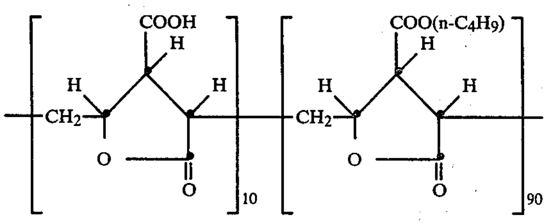

Compound 4

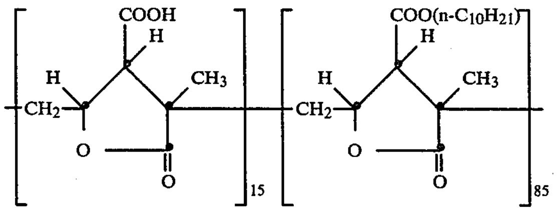

Compound 5

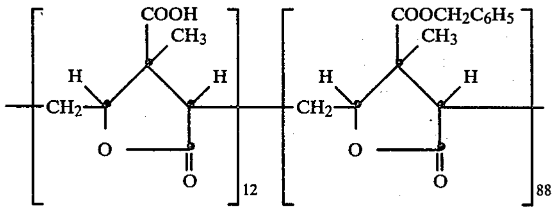

Compound 6

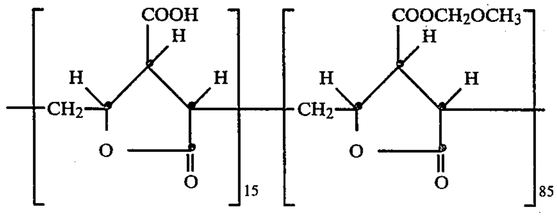

Compound 7

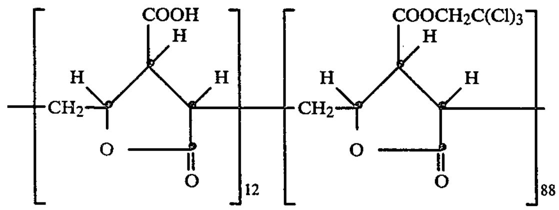

Compound 8

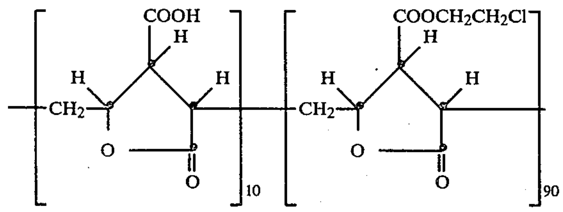

The dye image-providing material useful in this invention is either positive- or negative-working, and is either initially mobile or immobile in the photographic element during processing with an alkaline composition. Examples of initially mobile, positive-working dye image-providing materials useful in this invention are described in U.S. Pat. Nos. 2,983,606; 3,536,739; 3,705,184; 3,482,972; 2,756,142; 3,880,658 and 3,854,985. Examples of negative-working dye image-providing materials useful in this invention include conventional couplers which react with oxidized aromatic primary amino color developing agents to produce or release a dye such as those described, for example, in U.S. Pat. No. 3,227,550 and Canadian Pat. No. 602,607. In a preferred embodiment of this invention, the dye image-providing material is a ballasted, redox-dye-releasing (RDR) compound. Such compounds are well known to those skilled in the art and are, generally speaking, compounds which will react with oxidized or unoxidized developing agent or electron transfer agent to release a dye. Such nondiffusible RDR's include negative-working compounds, as described in U.S. Pat. Nos. 3,728,113 of Becker et al; 3,725,062 of Anderson and Lum; 3,698,897 of Gompf and Lum; 3,628,952 of Puschel et al; 3,443,939 and 3,443,940 of Bloom et al; 4,053,312 of Fleckenstein; 4,076,529 of Fleckenstein et al; 4,055,428 of Koyama et al; 4,149,892 of Deguchi et al; 4,198,235 and 4,179,291 of Vetter et al; *Research Disclosure* 15157, November, 1976 and *Research Disclosure* 15654, April, 1977. Such nondiffusible RDR's also include positive-working compounds, as described in U.S. Pat. Nos. 3,980,479; 4,139,379; 4,139,389; 4,199,354, 4,232,107, 4,199,355 and German Pat. No. 2,854,946, the disclosures of which are hereby incorporated by reference.

In a preferred embodiment of this invention, positive-working quinone RDR's, are employed and the photographic element contains an incorporated reducing agent as described in U.S. Pat. No. 4,139,379, referred to above. In this embodiment, the positive-working quinone RDR compound as incorporated in a photographic element is incapable of releasing a diffusible dye. However, during photographic processing under alkaline conditions, the compound is capable of accepting at least one electron (i.e., being reduced) and thereafter releases a diffusible dye. Further details are found in U.S. Pat. No. 4,139,379, the disclosure of which is hereby incorporated by reference.

In another preferred embodiment, the quinone RDR's have the formula:

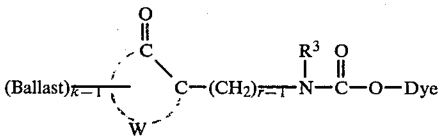

wherein:

Ballast is an organic ballasting radical of such molecular size and configuration as to render the compound nondiffusible in the photographic element during development in an alkaline processing composition;

W represents at least the atoms necessary to complete a quinone nucleus;

r is a positive integer of 1 to 2;

$R^3$ is an alkyl radical having 1 to about 40 carbon atoms or an aryl radical having 6 to about 40 carbon atoms;

k is a positive integer of 1 to 2 and is 2 when $R_3$ is a radical of less than 8 carbon atoms; and Dye is an organic dye or dye precursor moiety.

The photographic element in the above-described photographic assemblage is treated with an alkaline processing composition to effect or initiate development in any manner. One method for applying processing composition is by interjecting processing solution with communicating members similar to hypodermic syringes which are attached either to a camera or camera cartridge. The processing composition can also be applied by means of a swab or by dipping in a bath, if so desired. Another method of applying processing composition to a film assemblage which can be used in this invention is the liquid spreading means described in U.S. Pat. No. 4,370,407 of Columbus, issued Jan. 25, 1983.

In a preferred embodiment of the invention, the assemblage itself contains the alkaline processing composition and means containing same for discharge within the film unit. There can be employed, for example, a rupturable container which is adapted to be positioned during processing of the film unit so that a compressive force applied to the container by pressure-applying members, such as would be found in a camera designed for in-camera processing, will effect a discharge of the container's contents within the film unit.

The dye image-receiving layer in the above-described film assemblage is optionally located on a separate support adapted to be superposed on the photographic element after exposure thereof. Such image-receiving elements are generally disclosed, for example, in U.S. Pat. No. 3,362,819. In accordance with this embodiment of the invention, the dye image-receiving element would comprise a support having thereon, in sequence, a neutralizing-timing layer, as described previously, and a dye image-receiving layer. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above described film assemblage in another embodiment is located integral with the photographic element and is located between the support and the lowermost photo-sensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer, and dye images, formed as a function of development, diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention is employed is disclosed in Canadian Pat. No. 928,559. In this embodiment, the support for the photographic element is transparent and is coated with the image-receiving layer, a substantially opaque, light-reflective layer and the photosensitive layer or layers described above. A rupturable container, containing an alkaline processing composition and an opacifier, is positioned between the top layer and a transparent cover sheet which has thereon, a neutralizing-timing layer, as previously described. The film unit is placed in a camera, exposed through the transparent cover sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images, formed as a result of development, diffuse to the image-receiving layer to provide a positive, right-reading image which is viewed through the transparent support on the opaque reflecting layer background. For further details concerning the format of this particular integral film unit, reference is made to the above-mentioned Canadian Pat. No. 928,559.

Still other useful integral formats in which this invention can be employed are described in U.S. Pat. Nos. 3,415,644; 3,415,645; 3,415,646; 3,647,437 and 3,635,707. In most of these formats, a photo-sensitive silver halide emulsion is coated on an opaque support and a dye image-receiving layer is located on a separate transparent support superposed over the layer outermost from the opaque support. In addition, this transparent support also contains a neutralizing-timing layer as described above underneath the dye image-receiving layer.

In another embodiment of the invention, the neutralizing-timing layer described above is located underneath the photosensitive layer or layers. In that embodiment, the photographic element would comprise a support having thereon, in sequence, a neutralizing-timing layer, as described above, and at least one photosensitive silver halide emulsion layer having associated therewith a dye image-providing material. A dye image-receiving layer would be provided on a second support with the processing composition being applied therebetween. This format could either be integral, as described above, or peel-apart such as the two sheet image transfer elements described previously.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide negative emulsion layer. The film unit contains a silver halide solvent, preferably in a rupturable container with the alkaline processing composition.

A process for producing a photographic transfer image in color according to the invention from an imagewise exposed photosensitive element comprising a support having thereon at least one photosensitive silver halide emulsion layer having associated therewith a dye image-providing material comprises treating the element with an alkaline processing composition in the presence of a silver halide developing agent to effect development of each of the exposed silver halide emulsion layers. The processing composition contacts the emulsion layer or layers prior to contacting a neutralizing-timing layer as described above. An imagewise distribution of dye image-providing material is thus formed as a function of development, and at least a portion of it diffuses to a dye image-receiving layer to provide the transfer image.

The film unit or assemblage of the present invention is used to produce positive images in single or multicolors. In a three-color system, each silver halide emulsion layer of the film assembly will have associated therewith a dye image-providing material which possesses a predominant spectral absorption within the region of the visible spectrum to which said silver halide emulsion is sensitive, i.e., the blue-sensitive silver halide emulsion layer will have a yellow dye image-providing material associated therewith, the green-sensitive silver halide emulsion layer will have a magenta dye image-providing material associated therewith and the red-sensitive silver halide emulsion layer will have a cyan dye image-providing material associated therewith. The dye image-providing material associated with each silver halide emulsion layer is contained either in the silver halide emulsion layer itself or in a layer contiguous to the silver halide emulsion layer, i.e., the dye image-providing material can be coated in a separate layer underneath the silver halide emulsion layer with respect to the exposure direction.

The concentration of the dye image-providing material that is employed in the present invention can be varied over a wide range, depending upon the particular compound employed and the results desired. For example, the dye image-providing material coated in a layer at a concentration of 0.1 to 3 $g/m^2$ has been found to be useful. The dye image-providing material is dispersed in a hydrophilic film forming natural material or synthetic polymer, such as gelatin, polyvinyl alcohol, etc, which is adapted to be permeated by aqueous alkaline processing composition.

A variety of silver halide developing agents are useful in this invention. Specific examples of developers or electron transfer agents (ETA's) useful in this invention include hydroquinone compounds, such as hydroquinone, 2,5-dichlorohydroquinone or 2-chlorohydroquinone; aminophenol compounds, such as 4-aminophenol, N-methylaminophenol, N,N-dimethylaminophenol, 3-methyl-4-aminophenol or 3,5-dibromoaminophenol; catechol compounds, such as catechol, 4-cyclohexylcatechol, 3-methoxycatechol, or 4-(N-octadecylamino)-catechol; phenylenediamine compounds, such as N,N,N',N'-tetramethyl-p-phenylenediamine. In highly preferred embodiments, the ETA is a 3-pyrazolidinone compound, such as 1-phenyl-3-pyrazolidinone (Phenidone, trademark), 1-phenyl-4,4-dimethyl-3-pyrazolidinone (Dimezone, trademark), 4-hydroxymethyl-4-methyl-1-phenyl-3-pyrazolidinone, 4-hydroxymethyl-4-methyl-1-p-tolyl-3-pyrazolidinone, 4-hydroxymethyl-4-methyl-1-(3,4-xylyl)-3-pyrazolidinone, 1-m-tolyl-3-pyrazolidinone, 1-p-tolyl-3-pyrazolidinone, 1-phenyl-4-methyl-3-pyrazolidinone, 1-phenyl-5-methyl-3-pyrazolidinone, 1-phenyl-4,4-dihydroxymethyl-3-pyrazolidinone, 1,4-dimethyl-3-pyrazolidinone, 4-methyl-3-pyrazolidinone, 4,4-dimethyl-3-pyrazolidinone, 1-(3-chlorophenyl)-4-methyl-3-pyrazolidinone, 1-(4-chlorophenyl)-4-methyl-3-pyrazolidinone, 1-(3-chlorophenyl)-3-pyrazolidinone, 1-(4-chlorophenyl)-3-pyrazolidinone, 1-(4-tolyl)-4-methyl-3-pyrazolidinone, 1-(2-tolyl)-4-methyl-3-pyrazolidinone, 1-(4-tolyl)-3-pyrazolidinone, 1-(3-tolyl)-3-pyrazolidinone, 1-(3-tolyl)-4,4-dimethyl-3-pyrazolidinone, 1-(2-trifluoroethyl)-4,4-dimethyl-3-pyrazolidinone or 5-methyl-3-pyrazolidinone. A combination of different ETA's, such as those disclosed in U.S. Pat. No. 3,039,869, can also be employed. These ETA's are employed in the liquid processing composition or contained, at least in part, in any layer or layers of the photographic element or film unit to be activated by the alkaline processing composition, such as in the silver halide emulsion layers, the dye image-providing material layers, interlayers, image-receiving layer, etc.

In the invention, dye image-providing materials can be used which produce diffusible dye images as a function of development. Either conventional negative-working or direct-positive silver halide emulsions are employed. If the silver halide emulsion employed is a direct-positive silver halide emulsion, such as an internal image emulsion designed for use in the internal image reversal process, or a fogged, direct-positive emulsion such as a solarizing emulsion, which is developable in unexposed areas, a positive image can be obtained on the dye image-receiving layer by using ballasted, negative-working RDR's. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject.

Internal image silver halide emulsions useful in this invention are described more fully in the November, 1976 edition of *Research Disclosure,* pages 76 through 79, the disclosure of which is hereby incorporated by reference.

The various silver halide emulsion layers of a color film assembly employed in this invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye image-providing materials are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure,* the disclosure of which is hereby incorporated by reference.

Any material is useful as the image-receiving layer in this invention, as long as the desired function of mordanting or otherwise fixing the dye images is obtained. The particular material chosen will, of course, depend upon the dye to be mordanted. Suitable materials are disclosed on pages 80 through 82 of the November, 1976 edition of *Research Disclosure,* the disclosure of which is hereby incorporated by reference.

The alkaline processing composition employed in this invention is the conventional aqueous solution of an alkaline material, e.g., alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November, 1976 edition of *Research Disclosure,* the disclosure of which is hereby incorporated by reference.

The alkaline solution permeable, substantially opaque, light-reflective layer employed in certain embodiments of photographic film units used in this invention is described more fully in the November, 1976 edition of *Research Disclosure,* page 82, the disclosure of which is hereby incorporated by reference.

The supports for the photographic elements used in this invention can be any material, as long as it does not deleteriously affect the photographic properties of the film unit and is dimensionally stable. Typical flexible sheet materials are described on page 85 of the November, 1976 edition of *Research Disclosure,* the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone. In an alternative embodiment, the emulsions sensitive to each of the three primary regions of the spectrum can be disposed as a single segmented layer, e.g., as by the use of microvessels, as described in Whitmore U.S. Pat. No. 4,362,806, issued Dec. 7, 1982.

The silver halide emulsions useful in this invention, both negative-working and direct-positive ones, are well known to those skilled in the art and are described in *Research Disclosure,* Volume 176, December, 1978, Item 17643, pages 22 and 23, "Emulsion preparation and types"; they are usually chemically and spectrally sensitized as described on page 23, "Chemical sensitization", and "Spectral sensitization and desensitization", of the above article; they are optionally protected against the production of fog and stabilized against loss of sensitivity during keeping by employing the materials described on pages 24 and 25, "Antifoggants and stabilizers", of the above article; they usually contain hardeners and coating aids as described on page 26, "Hardeners", and pages 26 and 27, "Coating aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials", of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference.

*Research Disclosure* is a publication of Industrial Opportunities Ltd.; Homewell, Havant; Hampshire, P09 1EF, United Kingdom.

The term "nondiffusing" used herein has the meaning commonly applied to the term in photography and denotes materials that for all practical purposes do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photograhic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

EXAMPLE 1

Incubation Tests (A) A control cover sheet of the type described in my U.S. Pat. No. 4,029,849 referred to above is prepared by coating the following layers in the order recited on a transparent poly(ethylene terephthalate) film support:

(1) neutralizing layer of 14 g/$m^2$ of poly(n-butylacrylate-co-acrylic acid) (30:70 weight ratio) equivalent to 140 meq. acid/$m^2$; and (2) timing layer of a mixture of cellulose acetate (40% acetyl) at 10.5 g/$m^2$ and poly(styrene-co-maleic anhydride) (50:50 weight ratio) at 0.32 g/$m^2$.

(B) Another control cover sheet of the type described in my U.S. Pat. No. 4,229,516 referred to above is prepared by coating the following layers in the order recited as a transparent poly(ethylene terephthalate) film support:

(1) neutralizing layer of 14 g/$m^2$ of poly(n-butylacrylate-co-acrylic acid) (30:70 weight ratio) equivalent to 140 meq. acid/$m^2$; and (2) timing layer of a 1:1 physical mixture of the following two polymers coated from an organic solvent at 3.2 g/$m^2$:

(a) poly(acrylonitrile-co-vinylidene chloride-co-acrylic acid) (weight ratio 14/79/7); and (b) Compound 1 above at a ratio of acid/butyl ester of 15/85.

PRDR (0.58), incorporated reducing agent IRA (0.29), and inhibitor (0.007);

(9) interlayer of gelatin (1.1) and scavenger (0.43);

(10) blue-sensitive, negative-working silver bromoiodide emulsion (1.4 silver), gelatin (2.2), yellow PRDR (0.46), incorporated reducing agent IRA (0.45), and inhibitor (0.007); and

(11) overcoat layer of gelatin (0.98).

CYAN PRDR

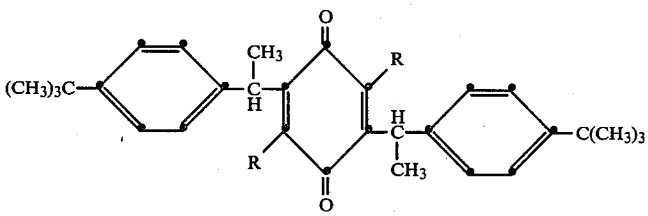

Where R =

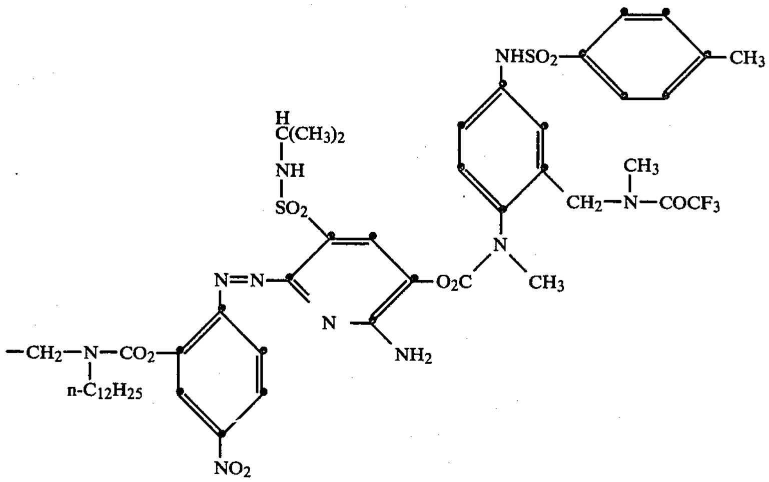

(C) A cover sheet according to the invention was prepared by coating at 22 g/$m^2$ on a transparent poly(ethylene terephthalate) film support a single neutralizing-timing layer of Compound 1 above, at a ratio of acid/butyl ester of 15/85 (0.80 meq. acid/g polymer or 18 meq/$m^2$).

An integral imaging-receiver (IIR) element was prepared by coating the following layers in the order recited on a transparent poly(ethylene terephthalate) film support. Quantities are parenthetically given in grams per square meter, unless otherwise stated.

(1) metal containing layer of nickel sulfate.6$H_2O$ (0.58) and gelatin (1.1);

(2) image-receiving layer of poly(4-vinylpyridine) (2.2) and gelatin (2.2);

(3) reflecting layer of titanium dioxide (17) and gelatin (2.6);

(4) opaque layer of carbon black (1.9) and gelatin (1.3);

(5) interlayer of gelatin (1.2);

(6) red-sensitive, negative-working silver bromoiodide emulsion (1.4 silver), gelatin (1.6), cyan positive-working, redox dye-releaser (PRDR) (0.55), incorporated reducing agent IRA (0.29), and inhibitor (0.02);

(7) interlayer of gelatin (1.2) and scavenger (0.43);

(8) green-sensitive, negative-working, silver bromoiodide emulsion (1.4 silver), gelatin (1.6), magenta Dispersed in diethyllauramide (PRDR:solvent 2:1)

MAGENTA PRDR

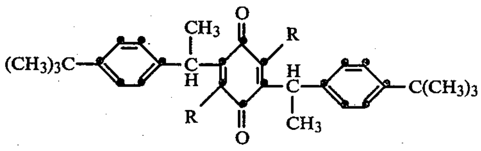

Where R =

-continued

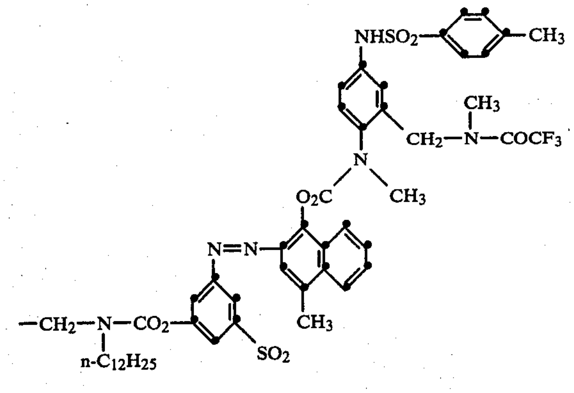

Dispersed in diethyllauramide (PRDR:solvent 1:1)

YELLOW PRDR

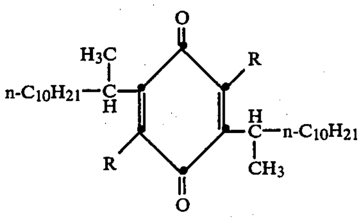

Where R =

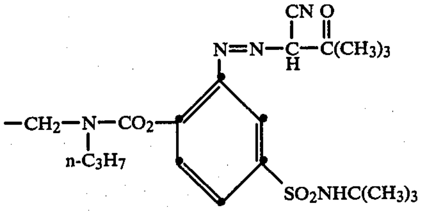

Dispersed in diethyllauramide (total solid:solvent 2:1)

IRA

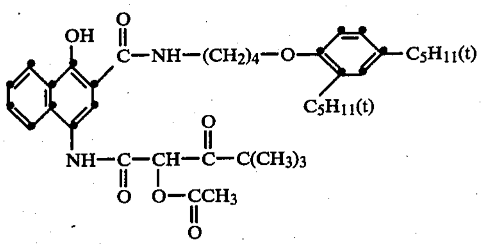

Dispersed in diethyllauramide (total solid:solvent 2:1)

INHIBITOR

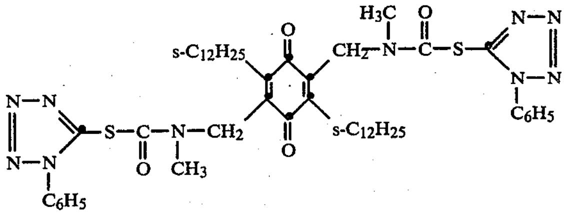

Dispersed in diethyllauramide (Total solid:solvent 2:1)

SCAVENGER

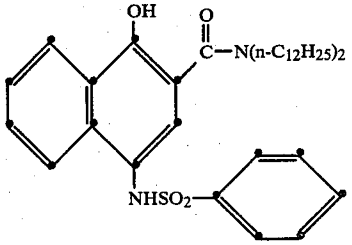

Samples of the imaging-receiver element were exposed in a sensitometer through a graduated density test object to yield a neutral at a Status A density of approximately 1.0. The exposed samples were then processed at about 21° C. by rupturing a pod containing the viscous processing composition described below between the imaging-receiver element and the cover sheets described above, by using a pair of juxtaposed rollers to provide a processing gap of about 65 μm.

The processing composition was as follows:

| | |
|---|---|
| 51 g | potassium hydroxide |
| 3.4 g | sodium hydroxide |
| 8 g | 4-methyl-4-hydroxymethyl-1-p-tolyl-3-pyrazolidinone |
| 10 g | ethylenediaminetetraacetic acid, disodium salt dihydrate |
| 0.5 g | lead oxide |
| 2 g | sodium sulfite |
| 2.2 g | Tamol SN ® dispersant |
| 10 g | potassium bromide |
| 56 g | carboxymethylcellulose |
| 172 g | carbon |
| | water to 1 liter |

The maximum density (Dmax) and minimum density (Dmin) were obtained within two hours after lamination (fresh) and also after incubation of the processed film unit at 60° C./70% RH for 16 hours and 48 hours. The following results were obtained:

TABLE I

| Cover Sheet | Neutralizing Layer | Timing Layer | 60° C./70% RH Incubation | $D_{max}$ R | $D_{max}$ G | $D_{max}$ B | $D_{min}$ R | $D_{min}$ G | $D_{min}$ B |
|---|---|---|---|---|---|---|---|---|---|
| A (Control) | Poly(n-butyl acrylate-co-acrylic acid) | Cell. acetate & Poly(styrene-co-maleic anhydride) | None (Fresh) | 1.9 | 1.7 | 2.0 | 0.16 | 0.14 | 0.19 |
| | | | 16 hrs. | | * | | 0.38 | 0.30 | 0.34 |
| | | | 48 hrs. | | * | | 0.85 | 0.92 | 1.05 |
| B (Control) | Poly(n-butyl acrylate-co-acrylic acid) | Poly(acrylonitrile-co-vinylidene chloride-co-acrylic acid) | None (Fresh) | 2.0 | 1.9 | 2.0 | 0.16 | 0.14 | 0.18 |
| | | | 16 hrs. | | * | | 0.50 | 0.39 | 0.44 |
| | | | 48 hrs. | | * | | 0.92 | 0.82 | 0.98 |

TABLE I-continued

| Cover Sheet | Neutralizing Layer | Timing Layer | 60° C./70% RH Incubation | $D_{max}$ R | G | B | $D_{min}$ R | G | B |
|---|---|---|---|---|---|---|---|---|---|
| | | & Carboxy-ester-lactone Compound 1 | | | | | | | |
| C | Combined Neutralizing-Timing Layer of Carboxy-ester-lactone Compound 1 | | None (Fresh) | 1.9 | 1.8 | 2.1 | 0.16 | 0.16 | 0.20 |
| | | | 16 hrs. | | * | | 0.22 | 0.18 | 0.26 |
| | | | 48 hrs. | | * | | 0.38 | 0.28 | 0.40 |

*$D_{max}$ values are essentially unchanged after incubation.

The above results indicate that the initial densitometry of the control cover sheets and that of the invention are equivalent. After incubation, however, there is a substantial improvement in Dmin using the combined neutralizing-timing layer of the invention as compared to either of the prior art cover sheets.

EXAMPLE 2

Room Keeping Test

Example 1 was repeated except that data was obtained on a different set of coatings, keeping was at room temperature instead of at elevated conditions, and the following Cyan PRDR was employed in Layer 6 instead of the one therein described:

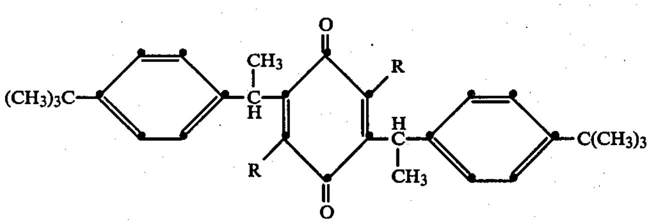

Where R =

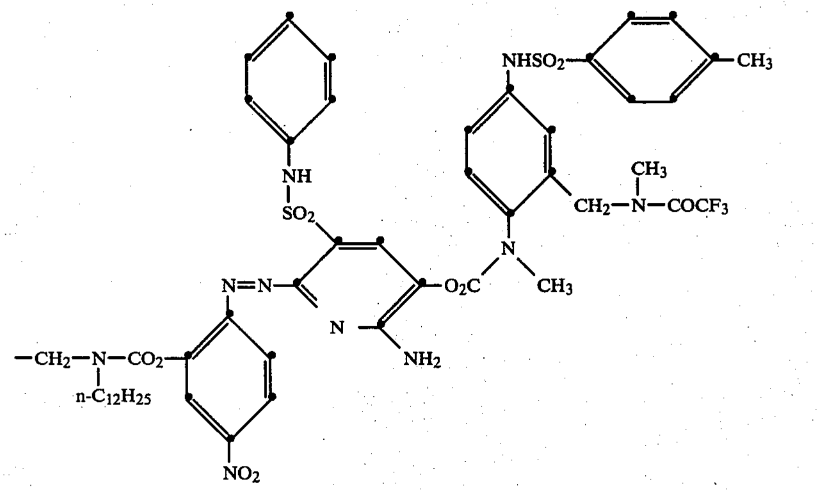

The following results were obtained:

TABLE II

| Cover Sheet | Neutralizing Layer | Timing Layer | Room Keeping Conditions | $D_{min}$* R | G | B |
|---|---|---|---|---|---|---|
| A (Control) | Poly(n-butyl acrylate-co-acrylic acid) | Cell. acetate & Poly(styrene-co-maleic anhydride) | None | 0.16 | 0.14 | 0.18 |
| | | | 2 weeks | 0.26 | 0.22 | 0.22 |
| | | | 6 weeks | 0.44 | 0.31 | 0.31 |

TABLE II-continued

| Cover Sheet | Neutralizing Layer | Timing Layer | Room Keeping Conditions | $D_{min}$* R | G | B |
|---|---|---|---|---|---|---|
| B (Control) | Poly(n-butyl acrylate-co-acrylic acid) | Poly(acrylonitrile-co-vinylene chloride-co-acrylic acid) & Carboxy-ester-lactone Compound 1 | None | 0.17 | 0.16 | 0.19 |
| | | | 2 weeks | 0.40 | 0.24 | 0.27 |
| | | | 6 weeks | 0.59 | 0.32 | 0.35 |
| C | Combined Neutralizing-Timing Layer of Carboxy-ester-lactone Compound 1 | | None | 0.20 | 0.16 | 0.22 |
| | | | 2 weeks | 0.26 | 0.20 | 0.24 |
| | | | 6 weeks | 0.28 | 0.22 | 0.26 |

*$D_{max}$ values for the control cover sheets and the one of the invention were equivalent.

The above results indicate that the Dmin values for the cover sheet of the invention remain stable over a longer period of time than those cover sheets of the prior art.

EXAMPLE 3

Light Fade Test

Cover sheets and an IIR element were prepared similar to those of Example 1. The IIR was exposed and processed as in Example 1. After processing, one portion of the stepped image was masked with opaque paper to serve as a "dark control". The remainder was left unmasked and both were simultaneously subjected to SANS (simulated average north skylight) light fade conditions (5.4 Klux.). The data in Table III below show changes in Status A density observed for a common IIR and pod using the different cover sheets. Two different coatings of cover sheet A, ($A^1$ and $A^2$) one coating of cover sheet B, ($B^1$) and two coatings of the cover sheet according to the invention ($C^1$ and $C^2$) were employed. The ΔD value is the density difference between a masked (dark) and unmasked (light exposed) area at an original neutral image density near 1.0. The following results were obtained:

TABLE III

| Cover Sheet | Neutralizing Layer | Timing Layer | 8 weeks SANS ΔR | ΔG | ΔB | 16 Weeks SANS ΔR | ΔG | ΔB |
|---|---|---|---|---|---|---|---|---|
| $A^1$ (Control) | Poly(n-butyl acrylate-co-acrylic acid) | Cell. acetate & Poly(styrene-co-maleic anhydride) | −0.23 | −0.06 | +0.13 | −0.43 | −0.14 | +0.13 |
| $A^2$ (Control) | Poly(n-butyl acrylate-co-acrylic acid) | Cell. acetate & Poly(styrene-co-maleic anhydride) | −0.24 | −0.07 | +0.06 | −0.39 | −0.12 | +0.06 |
| $B^1$ (Control) | Poly(n-butyl acrylate-co-acrylic acid) | Poly(acrylonitrile-co-vinylidene chloride-co-acrylic acid) & Carboxy-ester-lactone Compound 1 | −0.16 | −0.05 | +0.04 | −0.27 | −0.10 | +0.05 |
| $C^1$ | Combined Neutralizing-Timing Layer of Carboxy-ester-lactone Compound 1 | | −0.08 | −0.03 | +0.10 | −0.24 | −0.05 | +0.18 |
| $C^2$ | Combined Neutralizing-Timing Layer of Carboxy-ester-lactone Compound 1 | | −0.17 | −0.07 | +0.06 | −0.28 | −0.08 | +0.09 |

In general, one or both of the cover sheets of the invention show an improvement in light fading for cyan and magenta dyes when compared to one or more control cover sheets of the prior art. Positive ΔD values for yellow dye (blue density) fade are due in part to stain build-up so that their significance is difficult to interpret.

EXAMPLE 4

Milliequivalent Acid Content

Cover sheets were prepared by coating at 11 and 22 $g/m^2$ on a transparent poly(ethylene terephthalate) film support a single neutralizing-timing layer with the structure of Compound 1 above but having the meq. acid/g polymer as specified in Table IV below.

An IIR element was prepared similar to that of Example 1 except that in Layer 8, the IRA concentration was 0.26 $g/m^2$ instead of 0.29, and the following magenta PRDR was employed at 0.25 $g/m^2$ instead of the one described therein:

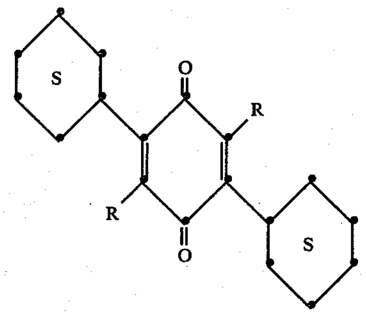

Where R =

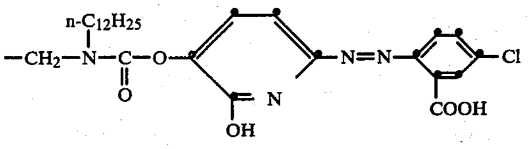

Dispersed in diethyllauramide (PRDR:solvent 1:1).

The cover sheets were processed as in Example 1 to obtain the following results:

TABLE IV

| Carboxy-Ester-Lactone Compound 1 Meq. Acid/g | Coverage (g/m2) | $D_{max}$ (Fresh) R | G | B |
|---|---|---|---|---|
| 0.8 | 22 | 2.0 | 1.9 | 1.9 |
| 1.0 | 22 | 1.8 | 1.9 | 1.8 |
| 1.0 | 11 | 1.8 | 1.9 | 1.8 |
| 1.2 | 22 | 1.1 | 1.8 | 1.6 |
| 1.2 | 11 | 1.4 | 1.8 | 1.8 |
| 1.3 | 22 | 0.6 | 1.6 | 1.4 |
| 1.3 | 11 | 0.6 | 1.6 | 1.5 |

The above results indicate that meq. of acid concentrations per gram of polymer of up to 1.0 are desirable. A higher acid content gives lower Dmax values, particularly cyan, due to a more hydrophilic layer which causes premature shut-down.

EXAMPLE 5

Surface pH Test

This example measures the effectiveness of the combined timing-neutralizing layer of the invention in lowering the system pH.

An IIR similar to that of Example 1 is flashed to room light and then processed as in Example 1, using cover sheets A and C of Example 1. The elements are then cut into small sections. At various time intervals, the IIR and cover sheet are pulled apart. The pH of the cover sheet at each time interval is determined with a glass surface pH electrode using established measuring techniques. The following results were obtained:

TABLE V

| Cover Sheet | Neutralizing Layer | Timing Layer | Surface pH Measurements After Transfer 10 Min. | 20 Min. | 40 Min. | 60 Min. | 12080 MMin. | | 24 Hours |
|---|---|---|---|---|---|---|---|---|---|
| A (Control) | Poly(n-butyl acrylate-co-acrylic acid) | Cell. acetate & Poly(styrene-co-maleic anhydride) | 11.8 | 11.3 | 10.8 | 10.4 | 9.9 | 9.1 | 5.8 |
| C | Combined Neutralizing-Timing Layer of Carboxy-ester-lactone) Compound 1 | | 12.0 | 11.6 | 11.2 | 10.9 | 10.3 | 9.5 | 8.2 |

The above results indicate that the cover sheet according to the invention is effective in lowering the system pH. The final equilibrium value is about 2.5 pH units higher than that obtained with the prior art cover sheet.

The invention has been described in detail with particular reference to preferred embodiments thereof, but it will be understood that variations and modifications can be effected within the spirit and scope of the invention.

What is claimed is:

1. A cover sheet adapted to be permeated by an alkaline processing composition comprising a transparent support having thereon a neutralizing-timing layer consisting essentially of a carboxy-ester-lactone polymer having recurring units of the formula

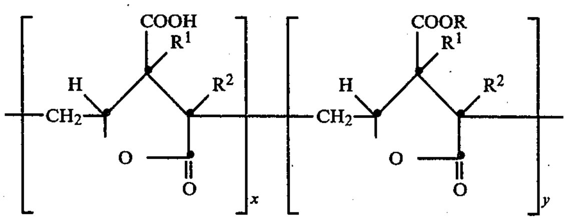

wherein

R is alkyl having from 1 to about 12 carbon atoms or aralkyl having from 7 to about 12 carbon atoms;

$R^1$ and $R^2$ are each independently hydrogen or methyl;

x is about 1 to about 15 mole %;

y is about 85 to about 99 mole %, said polymer comprising an acid content of up to about 1 milliequivalent of acid per gram of polymer.

2. The cover sheet of claim 1 wherein R is n-butyl and each $R^1$ and each $R^2$ is hydrogen.

3. In the cover sheet of claim 2, the further improvement wherein said polymer comprises from about 0.5 to about 1.0 milliequivalent acid per gram of polymer.

* * * * *